S. B. LUCKETT.
CLOTH MEASURING APPARATUS.
No. 84,290. Patented Nov. 24, 1868.
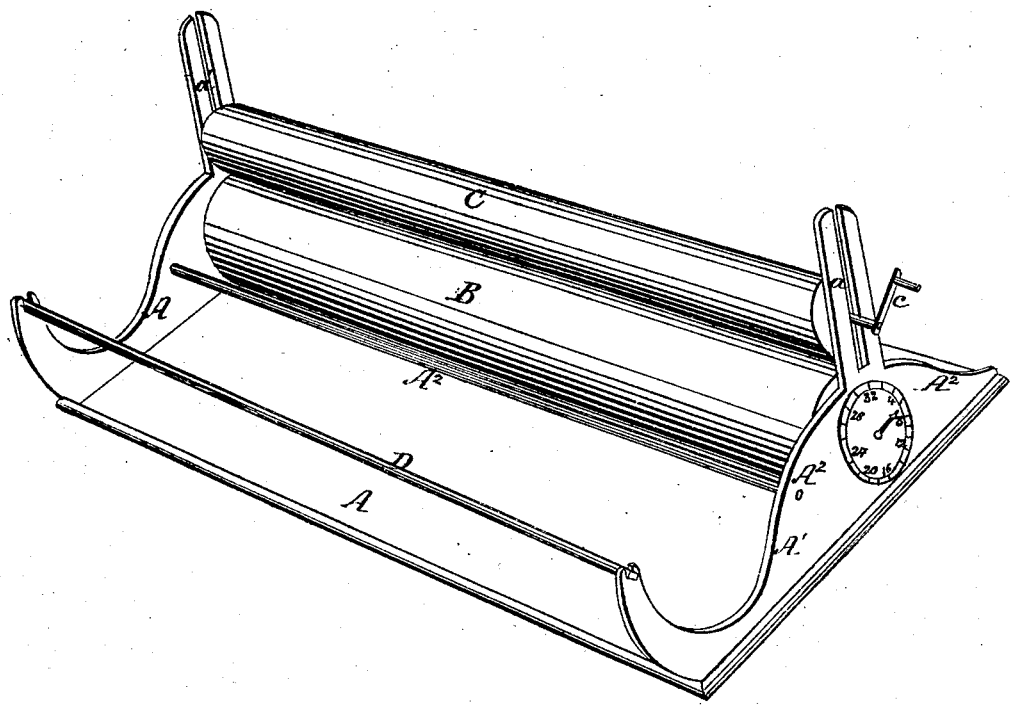
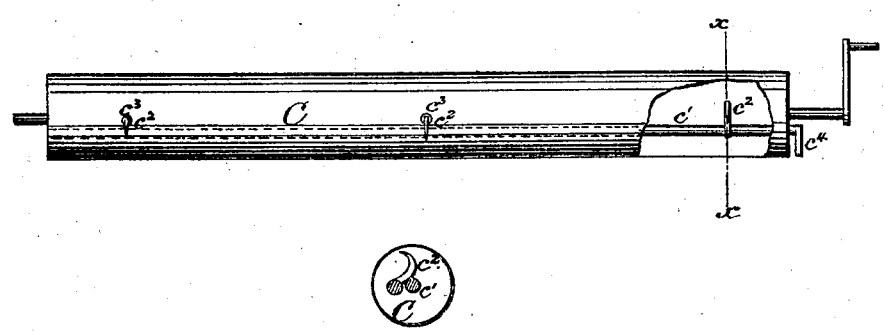
Witnesses.
S. J. Noyel.
E. R. Beadle
Inventor -
S. B. Luckett by
J. W. Beadle atty

SAMUEL B. LUCKETT, OF CORYDON, INDIANA.

Letters Patent No. 84,290, dated November 24, 1868.

IMPROVEMENT IN CLOTH-MEASURING APPARATUS.

The Schedule referred to in these Letters Patent and making part of the same.

*To all whom it may concern:*

Be it known that I, SAMUEL B. LUCKETT, of Corydon, in the county of Harrison, and State of Indiana, have invented new and useful Improvements in Cloth-Measurers; and I do hereby declare that the following is a full and exact description of the same, reference being had to the accompanying drawings, and to the letters of reference marked thereon.

This invention relates to certain improvements in apparatus for measuring cloth, and consists principally in a simple construction and arrangement, by means of which the cloth is measured and wound at the same time, as will be fully described hereinafter.

Figure 1. represents a perspective view of my improved apparatus;

Figure 2, an elevation of the winding-roller partly broken away to show the arrangement of the hooks for catching the cloth; and Figure 3. a sectional view through the line $x$–$x$, fig. 2.

In the drawings—

A represents the base from which rise the side pieces $A^1$ $A^1$, which latter are connected and held by the rods $A^2$.

B represents the measuring-cylinder hung in bearings in the side pieces $A^1$, the shaft of which is connected to any suitable arrangement of clock-work for registering the number of its revolutions. The pointer on the dial should be so arranged that it may be revolved in either direction, without operating the works, in order that it may be turned to the starting-point, when it is desired to commence a new piece, without necessitating the revolution of the cylinder.

C represents the cylinder upon which the cloth is wound. This rests upon cylinder B, being kept in place by means of the slotted standards $a$ $a$, which rise from the side pieces $A^1$.

$c$ represents the crank by which the cylinder is turned.

$c^1$ represents a rod arranged within cylinder C, which is provided with hooks $c^2$. These hooks are so arranged, in relation to the rod and to the holes $c^3$ of the cylinder, that when the rod is turned, (which is done by means of handle $c^4$,) the hooks are thrust out of the holes, or drawn in, as the case may be.

D represents a blunt-pointed rod which rests in open bearings in front of the measuring-cylinder. This is provided with shoulders upon each side of the journal, so that accidental displacement is impossible. It may, however, be readily removed when desired.

From this description the operation of my improved apparatus will be easily understood.

If the cloth is measured from the bolt, the rod D should be thrust through its centre, and its end be carried in between the measuring and receiving-cylinders. The hooks $c^2$ of the latter should then be thrust out, by which means the cloth will be caught and held. The cylinder C now being made to revolve by means of the crank $c$, the cloth will be wound thereon. The pressure of this cylinder upon the measuring-cylinder causes the latter to regularly revolve, which revolutions are accurately indicated by the pointer on the dial. When the bolt is all unwound, measured, and rewound, the cylinder C is lifted from its place, its hooks are drawn in, and the cloth then slipped off. If loose goods are to be measured, the cloth should be passed over the rod D and under the nearest rod $A^2$, and thence between the cylinders.

It will be observed that the cloth is not wound upon the measuring-cylinder, but merely passes over it.

By this arrangement the measure is accurate and reliable, as indicated by the dial, whereas if the cloth were wound upon the measuring-cylinder, each revolution would increase the measure by the thickness of the cloth, and the result produced by the indicator would not be correct.

By the construction and arrangement herein described, a simple and reliable apparatus is produced.

Having thus fully described my invention,

What I claim as new, and desire to secure by Letters Patent, is—

The cylinder B, arranged as described, cylinder C, with rod $c^1$, and hooks $c^2$, and rod D, the whole being combined and operated substantially in the manner and for the purpose set forth.

This specification signed and witnessed, this 2d day of June, 1868.

SAMUEL B. LUCKETT.

Witnesses:
JOHN E. HARTMAN,
HENRY DENLO.